M. PERKINS.
HAIR DRAWING MACHINE.
APPLICATION FILED JULY 21, 1919.
1,405,626.
Patented Feb. 7, 1922.
12 SHEETS—SHEET 8.
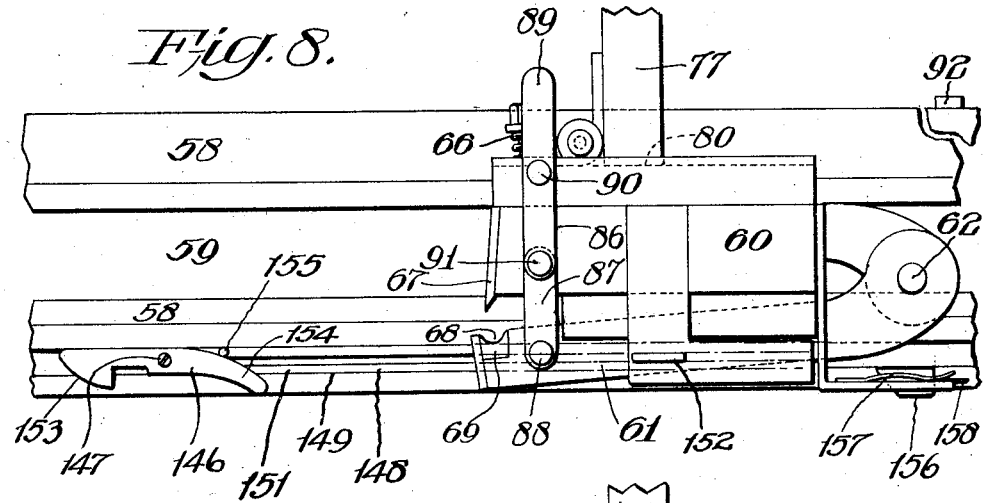
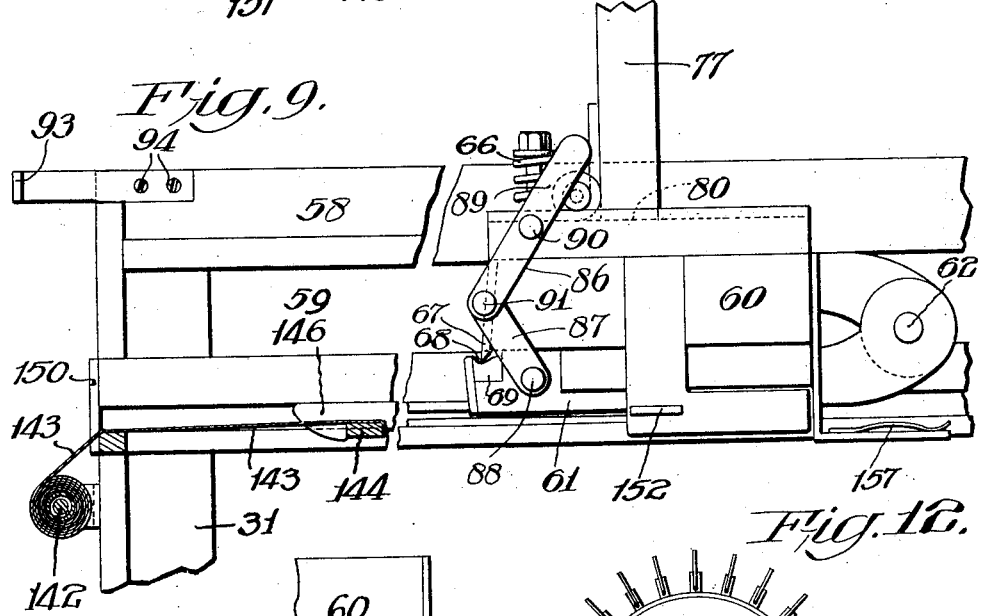
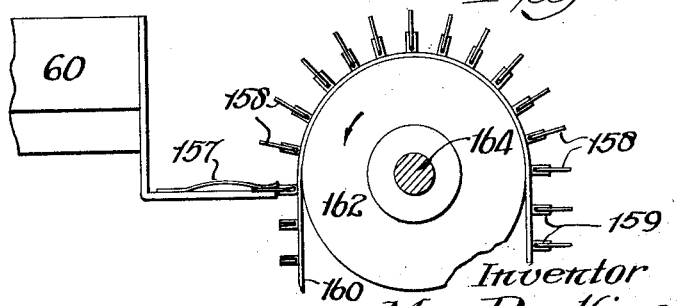
Witnesses:
R. H. Fambee
Augustus B. Coppee
Inventor
Max Perkins
By Joshua R. H. Potts
his Attorney

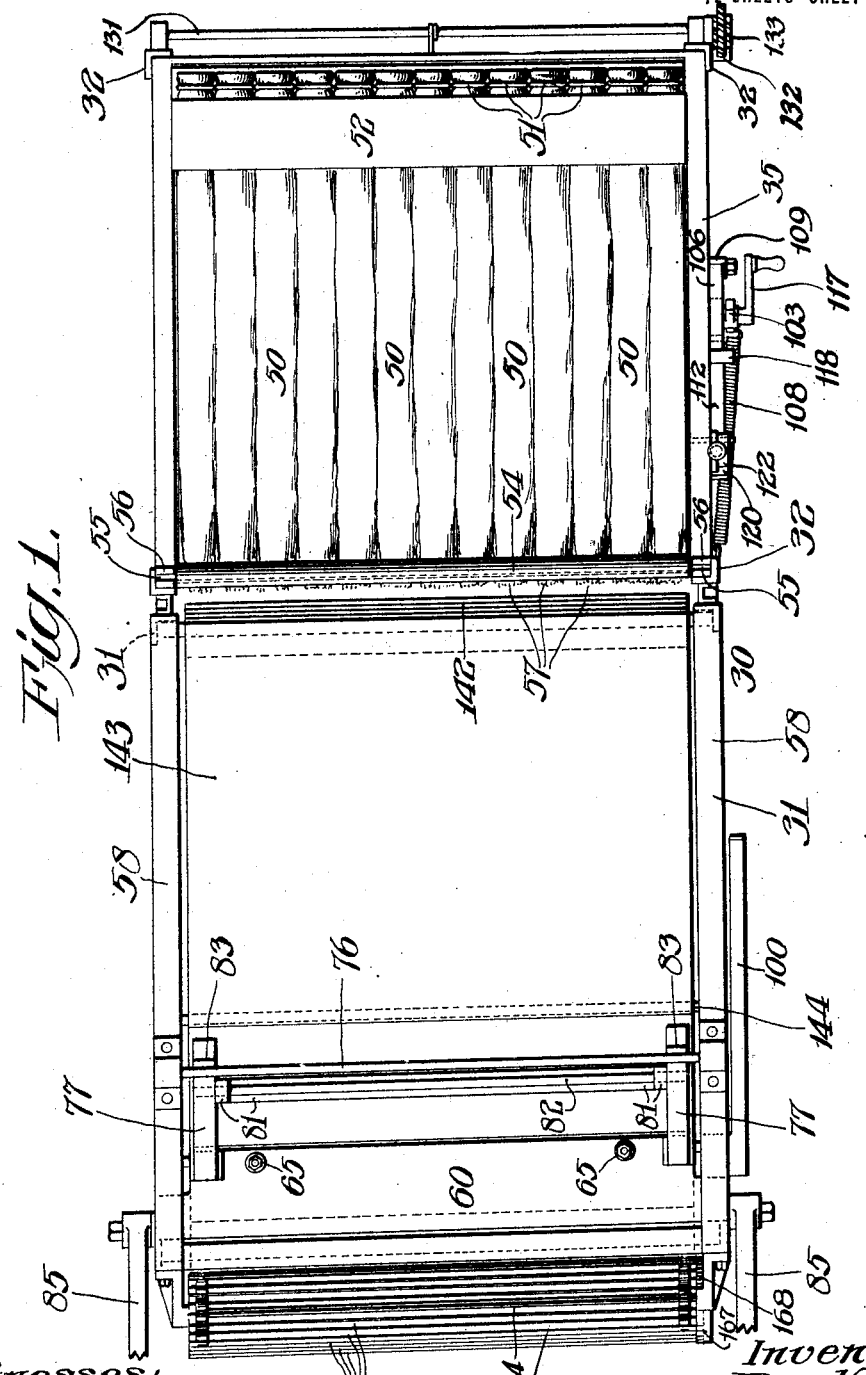

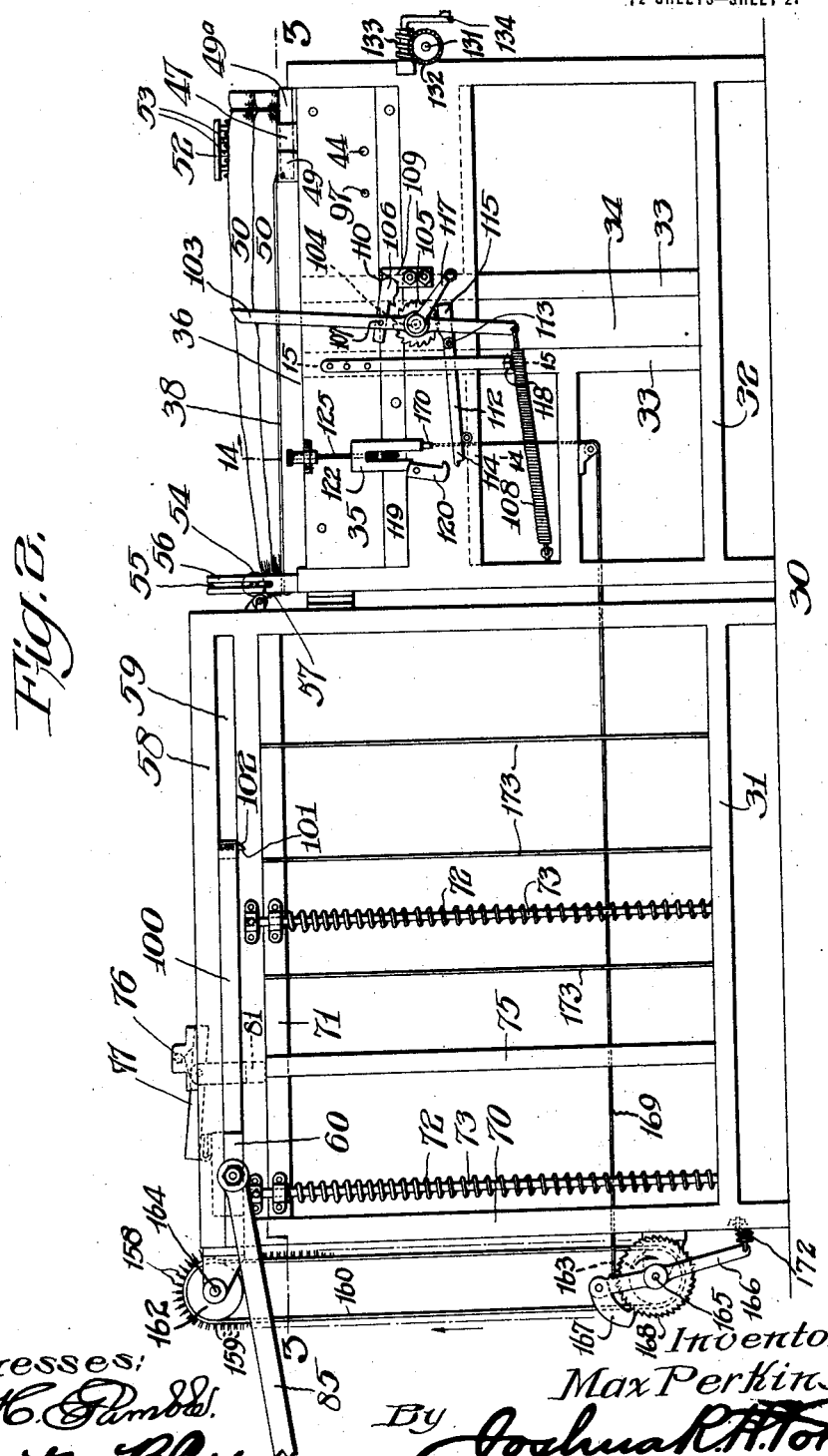

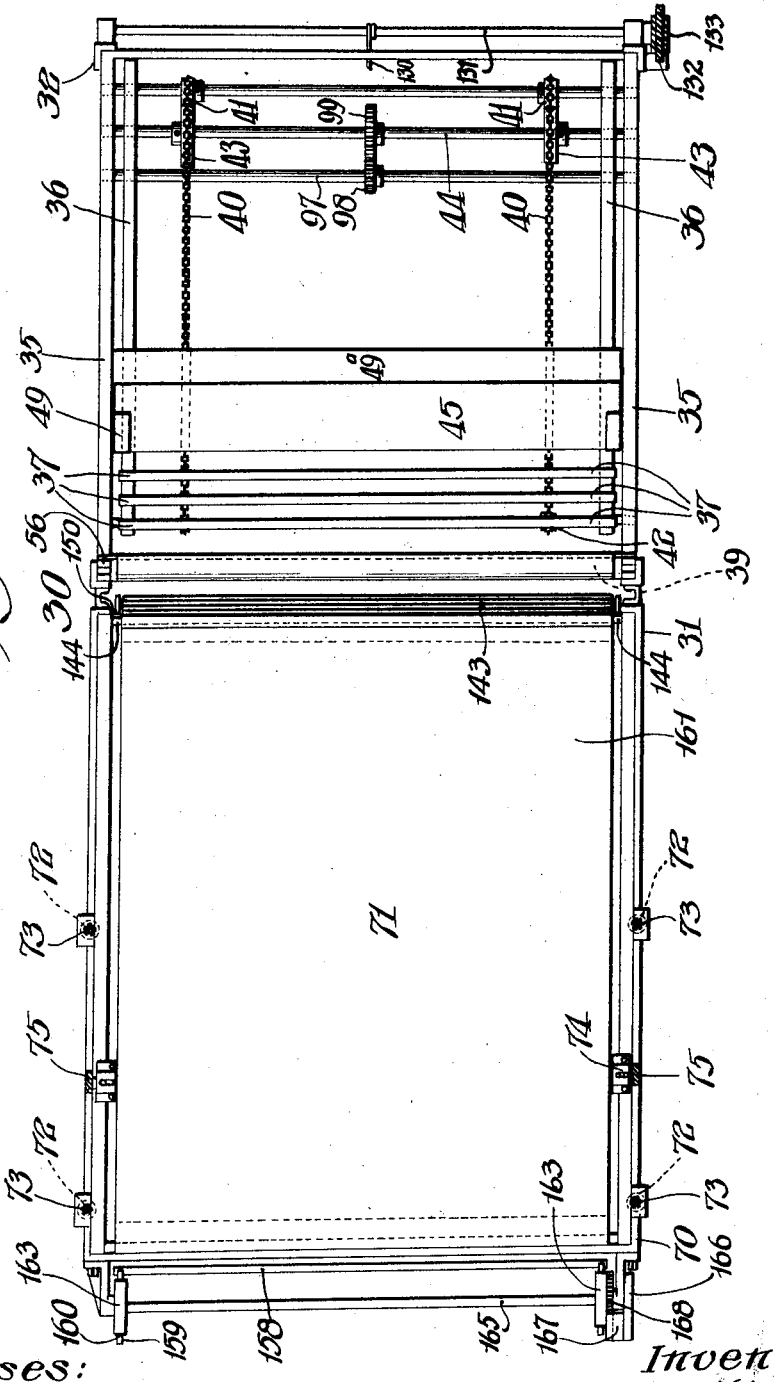

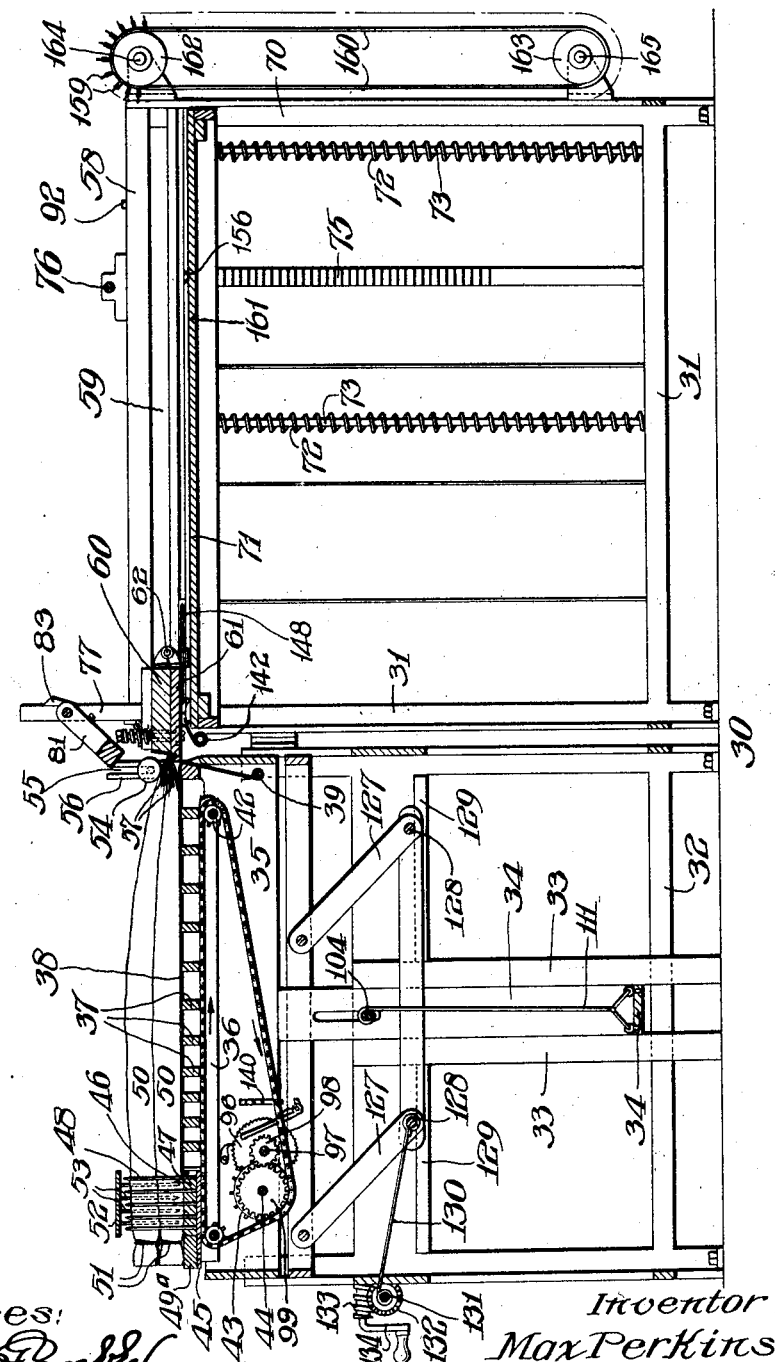

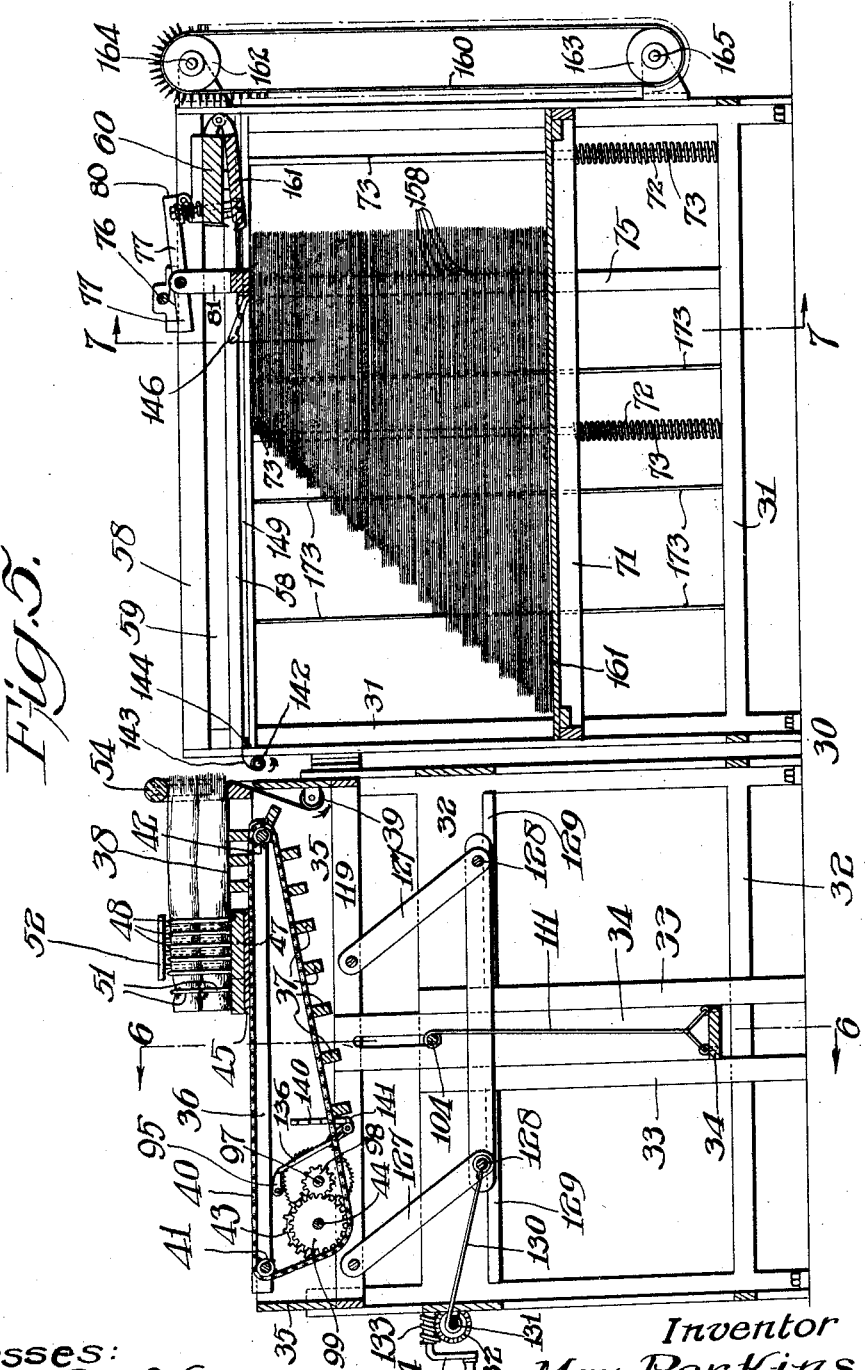

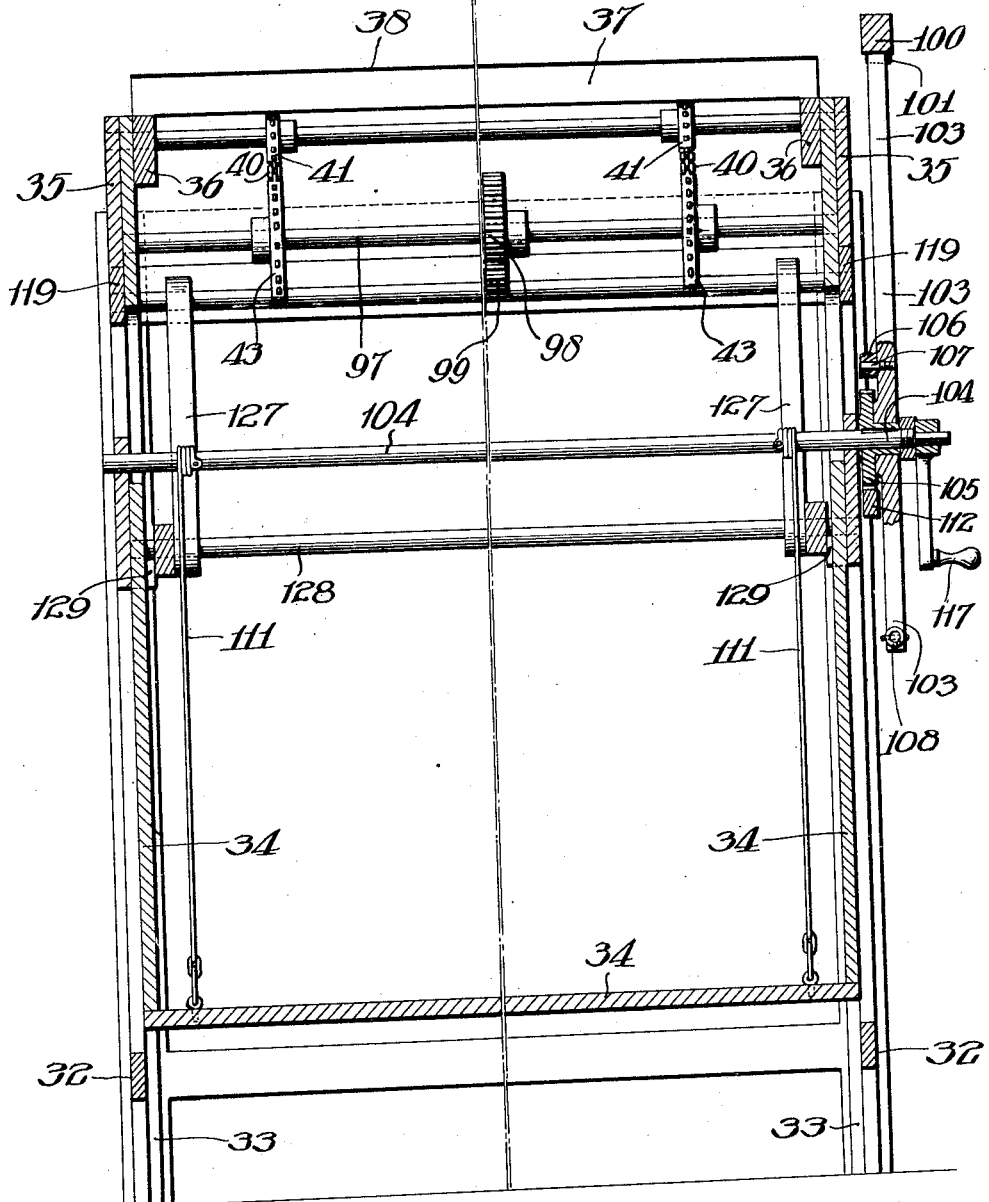

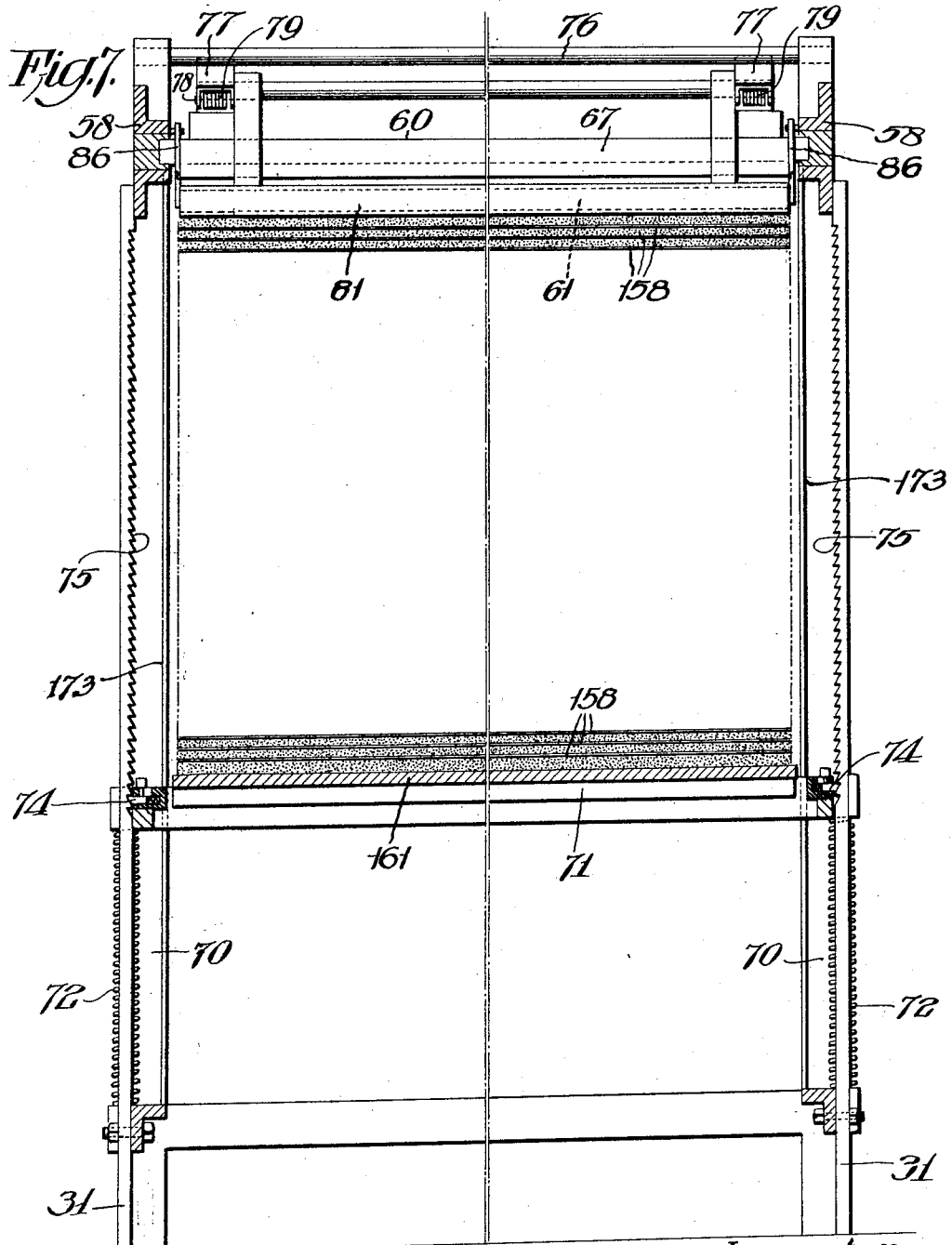

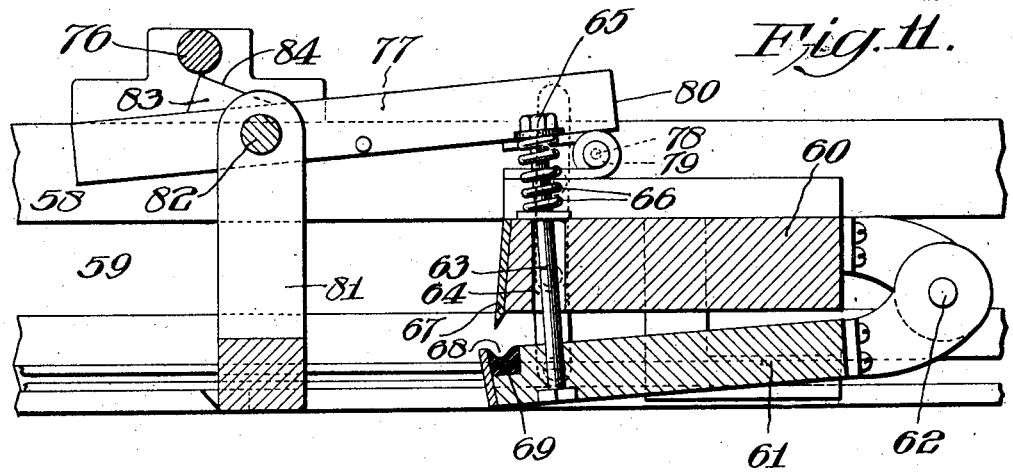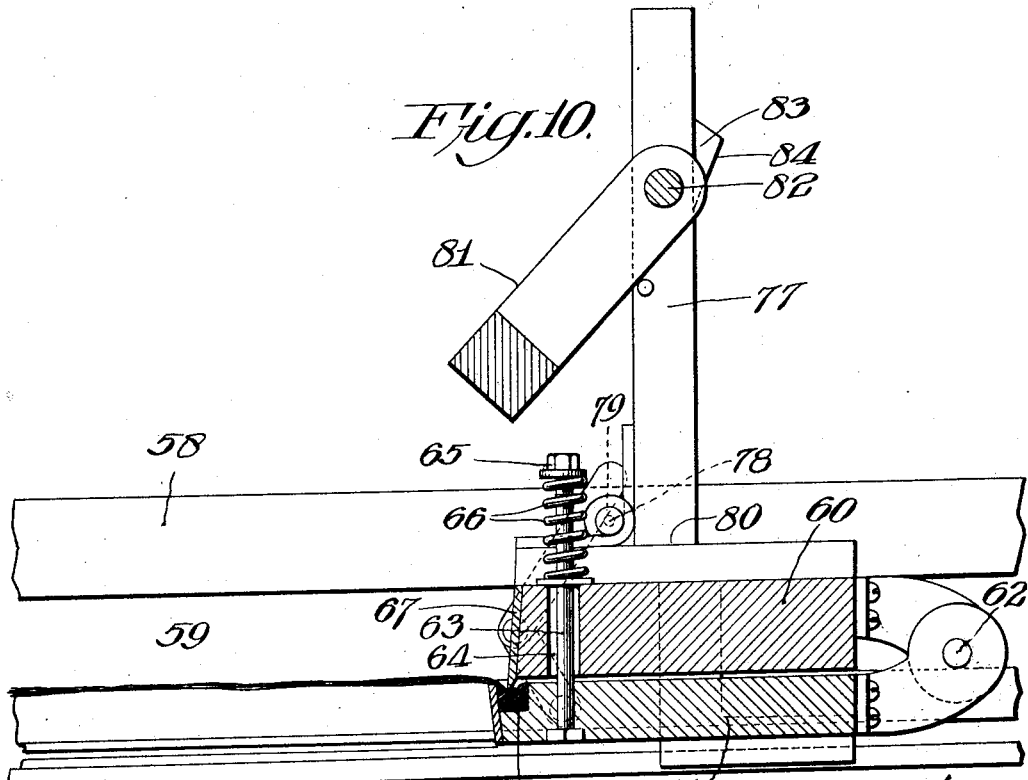

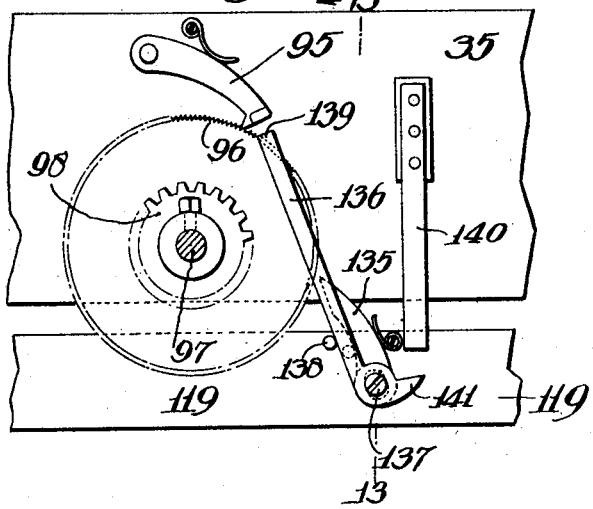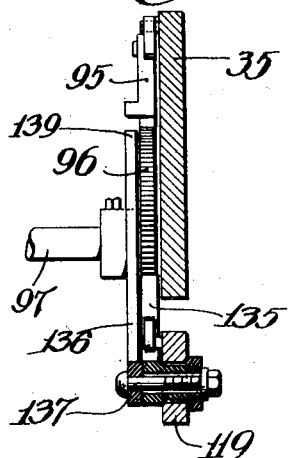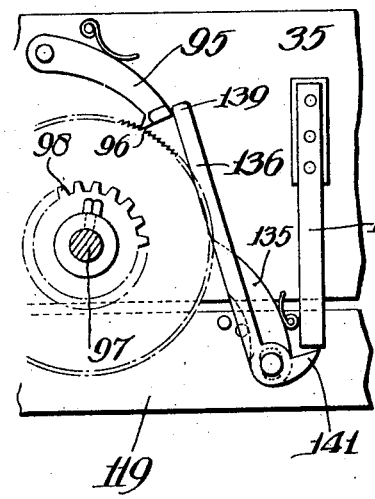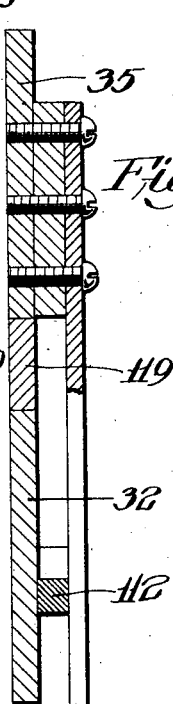

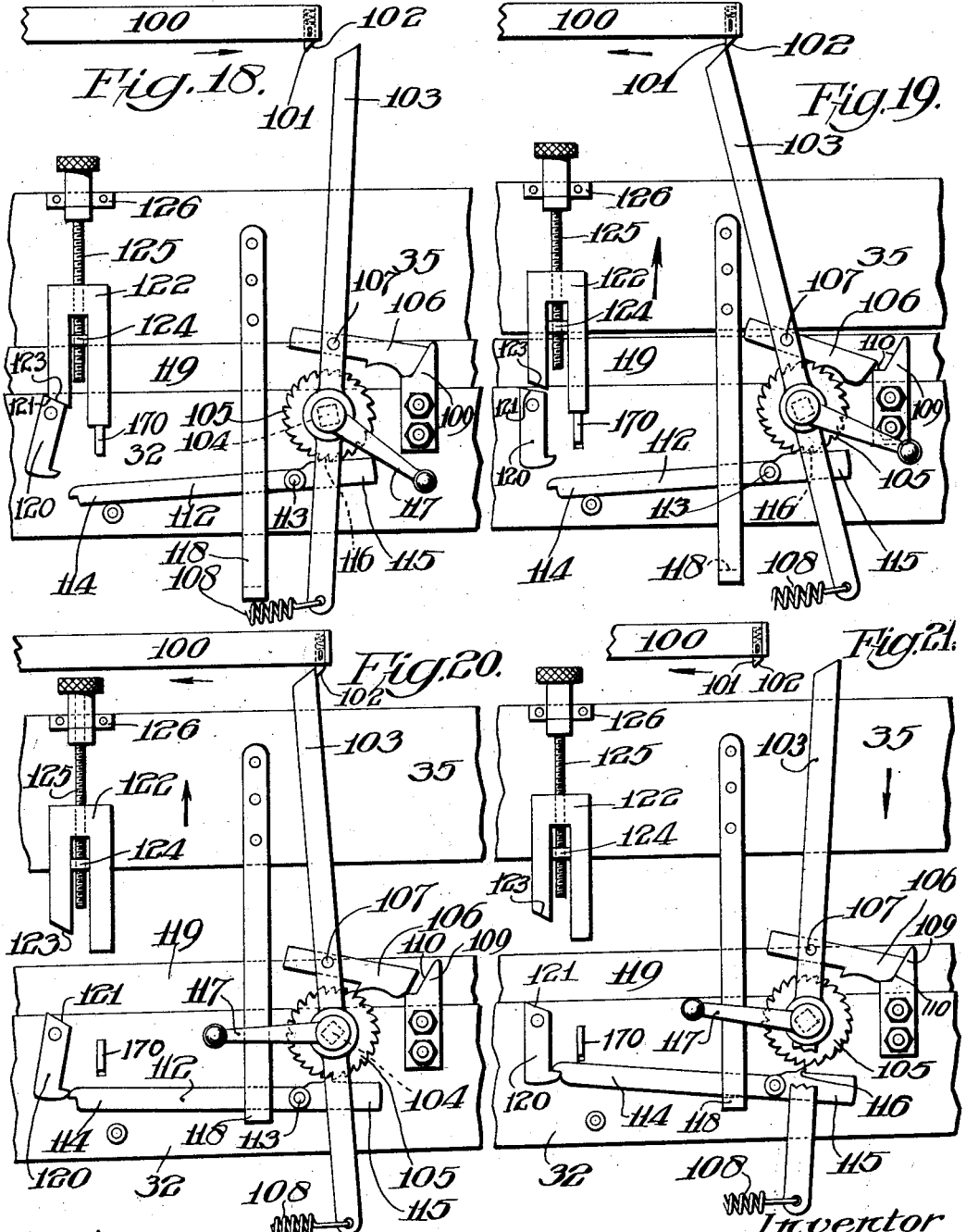

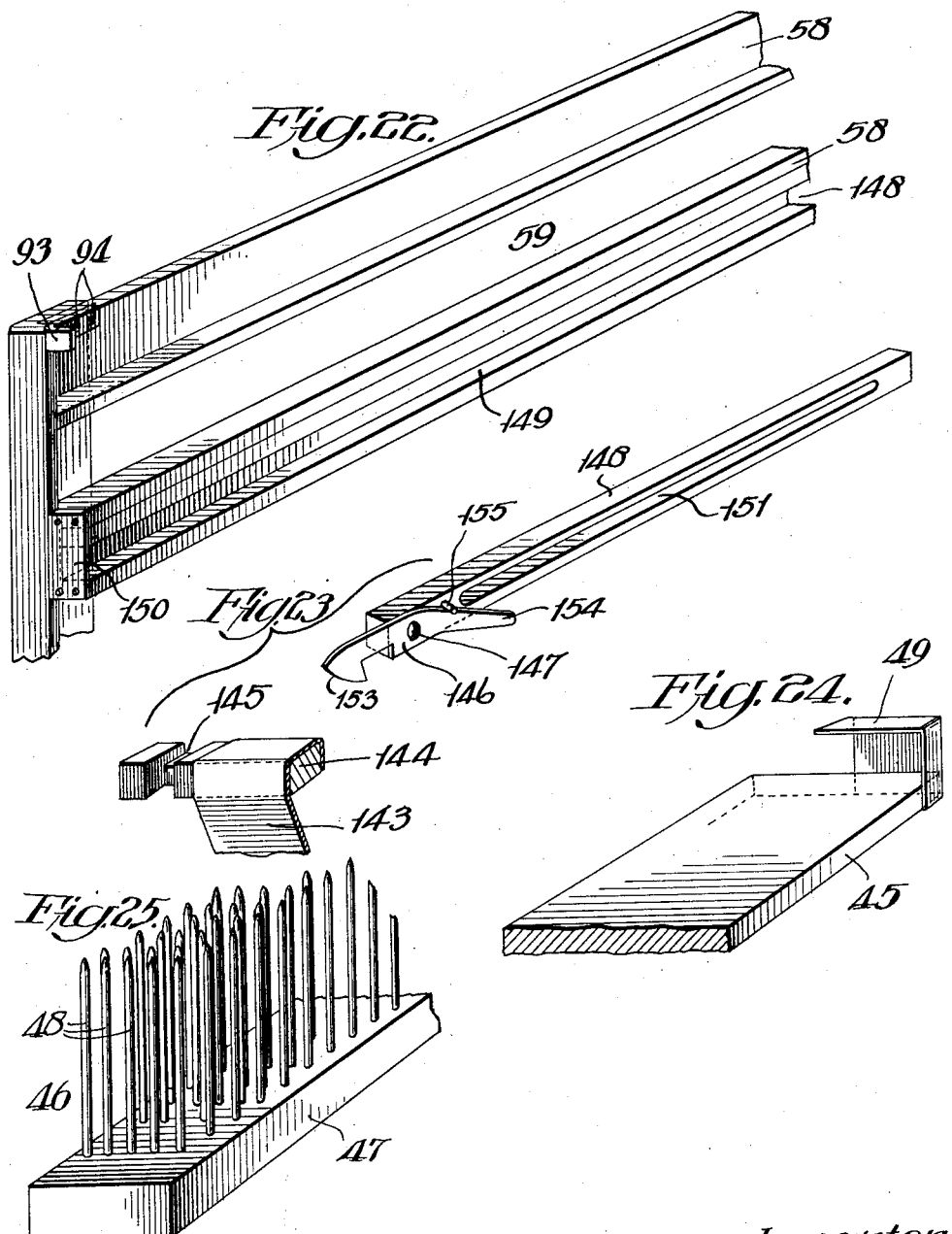

UNITED STATES PATENT OFFICE.

MAX PERKINS, OF PHILADELPHIA, PENNSYLVANIA.

HAIR-DRAWING MACHINE.

1,405,626.    Specification of Letters Patent.    Patented Feb. 7, 1922.

Application filed July 21, 1919. Serial No. 312,390.

*To all whom it may concern:*

Be it known that I, MAX PERKINS, a citizen of the United States, residing at Philadelphia, in the county of Philadelphia and State of Pennsylvania, have invented certain new and useful Improvements in Hair-Drawing Machines, of which the following is a specification.

Horse hair is used for various purposes. Generally speaking the longest hair is used for the manufacture of hair cloth, such for example as used in hair cloth or upholstery or interlining purposes for clothing, while the shorter hairs are used for the manufacture of brushes. This hair is commercially sold in bunches; the bunches having short and long hairs mixed together which must be sorted and graded so that the various lengths of hair can be used for different purposes as above noted. This process, prior to my invention, was universally done by drawing the hairs by hand and laying hairs of similar lengths in different piles. This hand drawing operation is very slow and the best experienced horse hair drawer can only draw about 100 pounds in a ten hour working day. Even an experienced operator cannot accurately do the work since the hair often slips, preventing the drawing of the intended amount, and during the drawing very often some of the hairs become disengaged from the fingers and become entangled with the other hairs causing loss of material and time. It is further obvious that this hand drawing is tiresome and monotonous since it requires great strength to secure sufficient leverage with the fingers upon the hair in order to grip the hair with sufficient strength to permit its withdrawal from a bunch of the hair which is usually held between cards. Further than this, the hands of the operator often become swollen and infected by the constant gripping of the hairs and it is extremely difficult to secure operators who are willing to work at this trade. Furthermore, it is impossible, by hand, to secure a uniform movement and consequently the hairs are grabbed at various distances from their ends, rendering it difficult to withdraw a similar number of hairs each time.

One object of my invention is to provide a machine which will quickly and accurately draw hair and lay the hair in piles; each pile having hairs therein of substantially similar lengths.

Another object is to so construct my invention that one operator can easily attend to a number of machines so as to reduce the cost of labor.

A still further object is to so construct my improved machine that there will be practically no waste since the machine will operate positively and accurately at each operation and will grip the hairs with sufficient strength as to prevent any "slips" during the operation thereof.

These objects, and other advantageous ends which will be described hereinafter, I attain in the following manner, reference being had to the accompanying drawings in which—

Figure 1 is a top plan view of my improved machine showing a plurality of bundles of hair positioned therein ready to be drawn, Figure 2 is a side elevation of Figure 1, Figure 3 is a sectional plan view taken on the line 3—3 of Figure 2.

Figure 4 is a sectional elevation showing the gripping jaws moved forwardly and in gripping position ready to draw some of the longer hairs from the bundles, Figure 5 is a sectional elevation of the same general character as Figure 4 showing the machine after having operated a number of times and having withdrawn and packed hairs in superimposed piles upon a table, said table being moved downwardly due to pressure so as to accommodate the hairs as they are piled thereon, said piles being separated by spacing or separating strips.

Figure 6 is an enlarged transverse sectional elevation taken on the line 6—6 of Figure 5, Figure 7 is an enlarged transverse sectional elevation taken on the line 7—7 of Figure 5, Figure 8 is an enlarged fragmentary elevation showing the gripping jaws opened and moving forwardly to grasp the hair, Figure 9 is a view of similar nature to Figure 8 showing the gripping jaws closed and in gripping engagement with the hair and conveying the hair rearwardly; said figure also showing an apron which is moved in conjunction with the gripping jaws and operative to support the major portion of the hairs as they are conveyed so as not to entangle the previously drawn hairs, Figure 10 is a fragmentary sectional elevation showing the gripping jaws holding and conveying the hair and in a position prior to the opening of the jaws and also showing a beater ready to move downwardly into engagement with the hairs when the jaws are opened so as to pack the hairs upon the table, Figure 11 is a view of similar nature to Figure 10 showing the jaws having been opened and the beater moved into position to pack the hair upon said table, Figure 12 is an enlarged fragmentary elevation showing a magazine for holding the spacing or separating strips and means for successively withdrawing the strips therefrom so as to convey them into a position to be dropped upon the successive piles of drawn hairs as they are packed upon the table, Figure 13 is an enlarged fragmentary section taken on the line 13—13 of Figure 16, Figure 15 is an enlarged fragmentary section taken on the line 14—14 of Figure 2, Figure 15 is an enlarged fragmentary section taken on the line 15—15 of Figure 2, Figures 16 and 17 are fragmentary elevations showing two positions of a certain group of elements forming a part of my invention, Figures 18, 19, 20 and 21 are fragmentary elevations showing, successively, various positions of another group of elements which form a part of my invention.

Figure 22 is a fragmentary perspective view showing guiding rails for the gripping jaws, Figure 23 is a detached fragmentary perspective view showing various elements of my invention, Figure 24 is a fragmentary perspective view of a hair supporting plate, and Figure 25 is a fragmentary perspective view of one of the cards which I preferably employ with my improved machine.

Referring to the drawings, 30 represents a base structure which is preferably made in two sections 31 and 32. The section 32 includes standards 33 which are spaced apart to provide slideways for extensions 34 which depend from a frame 35. The frame 35 has rails 36 which form a support for slats 37 which are connected to a flexible apron 38; one end of said apron being wound on a spring roller 39 mounted in the frame 35. The slats 37 are connected to belts or chains 40 which pass over idler sprockets 41 and 42 and also over a sprocket 43; said sprocket 43 being secured to a shaft 44 which extends through the frame 35. A plate 45 is slidably mounted on the rails 36 and is connected to the chains 40. A card 46 includes a block 47 which has pins 48 projecting upwardly therefrom; said card block being adapted to be slipped under hooded retaining brackets 49 which are secured at opposite ends of the plate 45 (see Figures 2 and 24). A filling strip 49ª is positioned on the plate 45 in front of the block 47 and assists the card block 47 in supporting bundles 50 of hair, as clearly shown in Figures 1, 2 and 4. The bundles of hair are usually tied as shown at 51 and are forced downwardly upon the card block 47 and filling strip 49ª so that the pins 49 penetrate said bundles. Another card 52 has pins 53 depending therefrom and this card is forced downwardly upon the bundles of hair so that the pins 53 pierce the bundles 50 in spaces between the pins 48 of the card 46. Thus the bundles of hair adjacent their tied ends are securely held by the cards and are movable in conjunction with the plate 45 in a manner hereinafter described. Thus firmly held, the bundles 50 have their opposite free ends 57 extending toward the base section 31 and rest upon the apron 38. A weighted roller 54 has its opposite ends freely rotatable within slots 55 in brackets 56 and the roller 54 presses on the tops of the bundles 50 adjacent the free ends 57.

The base section 31 has upper substantially horizontal rails 58 at opposite sides thereof, said rails being spaced at 59 within their lengths so as to form sideways for the opposite ends of a cross beam 60, said beam having another cross beam 61 hinged thereto at 62 so that said cross beam 61 is directly below the cross beam 60. The cross beam 61 has bolt rods 63 secured thereto and extending upwardly through holes 64 in the cross beam 60. The bolt rods at their tops have heads 65 and coiled expansion springs 66 are interposed between the heads 65 and the top of the cross beam 60 so that said springs serve to move and hold the cross beam 61 to the cross beam 60. The cross beam 60 has a gripping plate 67 secured to its front edge; said plate being adapted to enter a groove 68 in a rubber or other soft resilient insert block 69 within the cross beam 61, as clearly shown in Figures 4, 8, 9, 10 and 11. The cross beams 60 and 61 together with their respective gripping plate 67 and resilient insert block 69 form gripping jaws for the hair and serve, as the beam 60 is moved along the rails 58, to successively pull hairs from the bundles 50 as will hereinafter be specifically described.

The base section 31 has legs 70 which are preferably made angular in cross section to form upright guideways for a table 71 or hair receiving member. The table 71 is normally held in a raised position by being supported by springs 72 which are coiled around guide-rods 73 secured in the section 31. The table 71 has spring pressed latches 74 (see Figure 7) which are adapted to engage in the teeth of toothed racks 75 which are supported at opposite sides of the section 31. The table 71 is adapted to receive and support the hairs as they are drawn from the bundles 50 and packed on said table by mechanism now to be described: A rod 76 extends transversely across the rails 58 and is secured above the top thereof. Two posts 77 are hinged at 78 to the top of the cross beam 60 and coiled springs 79 serve to normally keep the posts in an upright position; said springs being coiled around the hinges 78 and have their opposite ends in engagement respectively with the posts 77 and the top of the cross beam 60, as clearly shown in Figures 10 and 11. The ends 80 of the posts 77 are adapted to engage the top of the beam 60 and are therefore limited in their rearward movement by the springs 79, as clearly shown in Figure 10. A yoke 81 has its free ends respectively pivoted at 82 to the posts 77. Lugs 83 on the posts 77 have cam faces 84 which are adapted, when the beams 60 and 61 move rearwardly, to engage under the rod 76 and thereby swing the posts 77 on their hinges 78 as pivots so as to cause the yokes 81 to be moved downwardly and engage the hairs which are moved rearwardly by the gripping jaws. In other words, the rod 76 acts as a bridge barrier which is fixed at a lower level than the top portions of the posts 77, when the latter are in their upright positions, and therefore as the cross beams and their connected parts are moved rearwardly, for example as by the movement of connecting rods 85 which may be actuated by any suitable driving means, the yoke 81 will be moved downwardly to beat or pack the drawn hair upon the table 71. The beams 60 and 61 are coupled together by toggles 86. Each of the toggles includes a link 87 which is pivoted at 88 to the beam 61 and a lever 89 which is pivoted at 90 to the beam 60 and is also pivoted at 91 to the link 87. When the levers 89 are moved so as to be in substantially straight alignment with their respective links, as clearly shown in Figure 8, the beams 60 and 61 will be separated and held open against the action of the coiled springs 66. In other words, the gripping jaws will be opened. This opening movement of the jaws during said rearward movement is automatically effected by the levers 89 coming in contact with stops 92 fixed to the rails 58.

It will be understood that the connecting rods impart a reciprocating sliding movement to the beams 60 and 61 and their connected parts. When said beams are moved forwardly in an open position toward the free ends 57 of the bundles of hair, the levers 89 engage forward stops 93 which are adjustably secured to the base by screws 94 (see Figures 9 and 22) and as the beams continue to move forwardly, the links 87 and levers 89 will be moved on their pivots out of alignment so that the springs 66 will move the gripping plate toward the resilient insert 69 and thereby grip a number of the free ends of the hairs, and when the gripping jaws are moved rearwardly they will pull said gripped hairs out of the bundles and drag them over the table 71 until the posts 77 and yoke 81 are moved downwardly as above described and the gripping jaws are opened to permit the yoke to pack them upon the table. As the hairs become piled upon the table, the table will be moved downwardly, due to the action of the yoke 81, and the spring pressed latches 74 will successively enter lower teeth in the toothed racks 75 and the springs 72 will be compressed, for example as shown in Figure 7.

During the drawing action of the hairs by the gripping jaws as above described, the bundles of hair will be held securely against any longitudinal movement by means of a pawl 95 (see Figures 4, 5, 16 and 17) which engages the teeth of a ratchet wheel 96; said ratchet wheel being mounted on a rotatable shaft 97 in the frame 35. A gear wheel 98 is secured to the shaft 97, said gear wheel meshing with another gear wheel 99 which is secured to the shaft 44. Therefore since the shaft 44 has the sprocket 43 secured thereto, the bundles of hair will be prevented from moving longitudinally while the gripping jaws are drawing hairs therefrom.

The arrangement is such that the gripping jaws first draw the longest hairs from the bundles as shown in Figure 4 and when in this position the cards and the tied ends are at their extreme forward positions. It will be noted, however, that since the plane of movement of the gripping jaws is constant and also since the gripping jaws move along the rails the same distance each time that it is necessary to vary the elevation of the bunches 50 of hair in order that the gripping jaws will not draw from the bundles at the same relative level each time the jaws make their sliding movement. This change of position of the bundles 50 with respect to the gripping jaws is accomplished in the following manner; reference being had particularly to Figures 2, 18, 19, 20 and 21. An arm 100 is connected to the cross beam 60 and has a spring pressed latch 101 depending therefrom; said latch being provided with a forward beveled surface 102. This beveled surface of the latch, when the gripping jaws are moved forwardly, engages a lever 103 which is pivotally mounted on a shaft 104, said shaft having a bearing in the base section 32. By thus engaging the lever 103, the latch 101 will be pushed inwardly so that it will not actuate the lever 103. However, after it passes the lever 103 the latch will move outwardly and during the rearward movement of the gripping jaws, the latch will swing the lever 103 on the shaft 104. A ratchet wheel 105 is secured on the shaft 104 and a pawl 106 is pivoted at 107 to the lever 103. A spring 108 is connected at one end to the section 32 and at its opposite end is connected to the lever 103 below its pivot point. This spring 108 normally holds the lever 103 with the pawl 106 in engagement with a rest 109, said rest having a cam face 110, which, when the lever is moved by the spring 108, will lift the pawl 106 out of engagement with the ratchet wheel 105. However, as the lever 103 is swung by the latch 101, the pawl will drop into engagement with the ratchet wheel 105 and partially rotate the same. The shaft 104 has cables 111 wound thereon as shown in Figures 4, 5 and 6; said cables also being connected to the extensions 34 of the frame 35. A detent lever 112 is pivoted at 113 to the base section 32 and has its end 114 of greater weight than the end 115. The end 115 has a projection 116 which normally engages the teeth of the ratchet 105 and thereby prevents the ratchet 105 from turning backwardly after having been moved by the pawl 106. By this construction it will be noted that for each reciprocation of the gripping jaws, the shaft 104 will be partially rotated and thereby wind the cables 111 thereon causing the extensions 34 to be raised and since the extensions 34 are connected to the frame 35 which supports the bundles of hair, the latter will be intermittently raised so that the gripping jaws will draw hairs from the bundles at different relative heights. The shaft 104 is also provided with a handle 117 whereby the frame 35 can be manually raised if occasion demands. The frame 35 has a hook 118 secured thereto and said hook, when the frame has been raised to a predetermined height, is adapted to lift the end 114 of the detent 112 and thereby withdraw the projection 116 from the ratchet 105 and thereby permit the frame 35 to fall by gravity upon a supplemental frame 119 which is interposed between the frame 35 and the side pieces 120 of the base section 32. Figure 2 shows the supplemental frame in its lowest position with the frame 35 engaging the top thereof ready to be raised; this position also being clearly illustrated in Figure 18. Figure 19 shows the frame 35 after having been slightly raised with the detent 112 acting as a check to prevent the dropping of the frame 35. Figure 20 shows the frame 35 raised to its extreme height and with the hook 118 starting to engage the detent 112. Figure 21 shows the hook 118 having raised the detent and with the projection 116 withdrawn from the ratchet wheel 105; the position of the elements being as they occur while the frame 35 is falling. The latch 120 is so positioned as to swing under the end 114 of the detent 112 and thereby hold the projection 116 free of the ratchet wheel 105 while the frame 35 is falling. The upper end of the latch 120 is beveled as shown at 121 and a tripper 122 on the frame 35 has a beveled portion 123 adapted to engage the end 121 of the latch 120 and swing the latch out of engagement with the detent 112 to permit the detent to again hold the ratchet wheel 105.

The tripper 122 has a nut 124 through which extends an adjusting screw 125; said adjusting screw being mounted in a bearing 126 so that when said adjusting screw is rotated the tripper can be moved upwardly or downwardly with respect to the frame 35; thus timing the engagement of the tripper with the latch 120 to suit various requirements, such for example as when it is desired to prevent the frame 35 from falling into its extreme lowest position.

The supplemental frame has links 127 pivotally connected thereto; said links being pivotally connected by bars 128 which are slidable horizontally on tracks 129. A cable 130 is connected to one bar 128 and to a shaft 131; said shaft being rotatable by a worm gear 132, a worm 133 and a handle 134 (see Figures 2, 4 and 5). Thus by turning the handle 134 to slide the bars 128, the supplemental frame 119 can be raised into various positions; it being noted that the supplemental frame 119 is confined to a substantially vertical movement within the base section 32. Thus the downward movement of the frame 35 can be limited according to the thicknesses of the bundles of hair.

The bundles of hair are intermittently moved rearwardly so that the gripping jaws, after they have drawn the longer hairs, can successively draw the shorter hairs. The mechanism for thus moving the bundles of hairs consists of the following. A pawl 135 is mounted on the supplemental frame 119 with its free end in the path of downward movement of the ratchet wheel 96. Thus when the frame 35 falls, the pawl 135 will engage the teeth of the ratchet wheel 96 and as the frame 35 continues to fall the ratchet wheel 96 will be partially rotated and through the medium of the gear wheels 98 and 99 will rotate the shaft 44 and thereby move the chain 40 in the direction of the arrows in Figure 4. The slats 37 will follow around the sprocket wheel 42 into the position shown in Figure 5 and the apron 38, due to the spring action of the roller 39, will wrap around said roller 39, as is also shown in Figure 5. A stop arm 136 is pivoted at 137 on the supplemental frame 119 and normally rests against a pin 130

138 on the supplemental frame 119 with its upper free end 139 in the path of the pawl 95 (see Figure 16). The stop arm 136 is of such length that the pawl 95 will engage the end 139 prior to the engagement of the ratchet wheel 96 with the pawl 135, thereby freeing the ratchet wheel to permit the latter to be rotated by said engagement therewith by the pawl 135. Just prior to the stopping of the frame 35 by engagement with the supplemental frame 119, a tripper 140 on the frame 35 strikes a lip 141 on the stop arm 136 and moves the stop arm out of engagement with the pawl 95 to permit said pawl 95 to again engage the ratchet 96 to prevent rotation of the shaft 44 while the gripping jaws are acting upon the hair to draw it from the bundles. Figure 17 shows the stop arm 136 having been moved out of holding engagement with the pawl 95 and also illustrating said latter pawl in engagement with the ratchet wheel 96.

A second spring roller 142 is mounted on the base section 31 and has one end of an apron 143 attached thereto; said apron at its outer free end being connected to a bar 144. The bar 144 has notches 145 adjacent opposite ends adapted to be engaged by latches 146 which are pivoted at 147 within their lengths to strips 148, as clearly shown in Figures 8, 10 and 22, which are slidable within grooves 149 in the rails 58; said grooves being closed at their forward ends by plates 150. The strips 148 are slotted at 151 and tenons 152 (see Figures 8 and 9) which are connected to the cross beam 60 project into the slots 151. The forward ends of the latches 146 are tapered as shown at 153 and are heavier than the rear ends 154 so that normally the rear ends 154 engage stop pins 155, as clearly shown in Figures 8 and 23. As the gripping jaws move forwardly, the tenons 152 abut the forward ends of the slots 151 and slide the strips 148 forwardly so as to permit the ends 153 of the latches 146 to hook over the notched portions of the bar 144. When the gripping jaws return drawing the hairs therewith, the strips 148 will be slid rearwardly and the latches 146 will pull the apron 143 with them so that said apron 143 will form a support for the hairs while being drawn and thereby prevent them from dragging on the hairs which have been previously packed upon the table 71. Stop blocks 156 are secured to the sides of the base section 31 and are positioned to be engaged by the ends 154 of the latches 146 during the rearward movement thereof so as to free the bar 144 and permit the roller 142 to automatically wind the apron thereon so as to remove the apron from under the hairs which have been last drawn from the bundles so that when the yoke 81 descends it can press said latter hair upon the hair which has been previously packed thereon. The plates 150 serve as stops for the bar 144 so that while the apron 143 is partially wound on the roller 142, the bar 144 will be in position to again be engaged by the latches 146 when the gripping jaws are again moved forwardly.

The beam 60 has bowed spring fingers 157 connected thereto and said fingers during the rearward movement of the gripping jaws move into clamping engagement with spacing or separating strips 158 which are frictionally held in spring clips 159 secured to a belt 160. The belt 160 and spring clips 159 form a magazine which is intermittently moved to successively present the spacing or separating strips 158 in a position to be gripped by the bowed fingers 157 when the gripping jaws moved rearwardly as above described. These spacing strips are for the purpose of separating the layers of hair as they are packed upon the table 71 so that when the top 161 of the table 71 is removed with the hair thereon, which can be done by slightly lifting the table top and sliding it through the base section 31, the hairs of various lengths can be easily gathered and removed from the pile. The stop blocks 156 are so situated that when the gripping jaws move forwardly the spacing strips 158, while being conveyed forwardly by the fingers 157, will strike said stop blocks 156 and since the spacing strips cannot pass the stop blocks a continued forward movement of the gripping jaws will cause the spacing strips to be detached from the fingers 157 and drop upon the hair as it is piled upon the table 71. The belt 160 passes over two pulleys 162 and 163 which are rotatably supported by shafts 164 and 165. A lever 166 is pivoted on the shaft 165 and carries a pawl 167; said pawl being operative to engage a ratchet wheel 168 which is secured to the shaft 165. A cable 169 is connected to the lever 166 above the shaft 165 and this cable at its opposite end is connected to one end of another lever 170 which is pivoted between its ends at 171. The opposite end of the lever 170 is adapted to be engaged, during the fall of the frame 35, by the tripper 122. This action causes the lever 170 to be swung on its pivot and thereby swing the lever 166 through the medium of the cable 169 to cause the belt 160 to be intermittently moved as above described; it being noted that the pawl 167, when the lever 166 is swung by the movement of the cable 169, will actuate the ratchet 168. A spring 172 is connected to the lower end of the lever 166 and serves to move the pawl 167 into engagement with the next tooth on the ratchet wheel 168 after the frame 35 has again been raised so as to free the lever 170 of the tripper 122. Thus when the frame 35 again falls the pawl 167 will be in a position to again move the ratchet wheel 168 to bring another one of the spacing strips in position to be grasped by the fingers 157.

Guard rods 173 are slidably positioned in the base section 31 at opposite sides of the table 71 for the purpose of preventing any chance of the hairs as they are packed upon the table from falling over the sides thereof (see Figure 7). However, the spacing strips 158 serve as binders for the hairs which are packed on the table and ordinarily keep the hairs in proper position.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A hair drawing machine for transferring hairs from bundles containing hairs of various lengths and automatically placing the hairs in piles in which any one pile will contain hairs of substantially similar length including means for supporting a bundle of hair; means adapted to advance relatively to said bundle to successively grip and draw hairs of different lengths therefrom; and means for relatively moving said bundle and gripping means transversely to said first movement whereby the gripping means can draw hairs from said bundle at different positions throughout its thickness; substantially as described.

2. A hair drawing machine including means for supporting a bundle of hair; a table; and means operative to grip and draw hairs of different lengths successively from said bundle and transfer them to the table; substantially as described.

3. A hair drawing machine including means for supporting a bundle of hair; a table; means operative to grip and draw hairs of different lengths successively from said bundle and convey them over the table; and means movable into engagement with said drawn hairs to pack them upon said table; substantially as described.

4. A hair drawing machine including means for supporting a bundle of hair; a table; means operative to grip and draw hairs of different lengths successively from said bundle and convey them over the table; and means movable into engagement with said drawn hairs to pack them upon said table, said gripping means and table being movable relatively to each other to increase the distance therebetween whereby an increasing number of hairs can be piled upon said table; substantially as described.

5. A hair drawing machine including means for supporting a bundle of hair; a table; means movable relatively to said bundle and adapted to successively grip and draw hairs of different lengths from said bundle and convey them over said table; supporting means forming a guide for said gripping means; posts hinged to and movable in conjunction with said gripping means; means for moving and normally holding said posts in an upright position; means extending transversely between said posts; and abutting means on said supporting means and adapted to be engaged by said posts during the drawing movement of said gripping means and thereby swing said posts on their hinges to cause said transverse means to engage said drawn hairs and pack them on said table; substantially as described.

6. A hair drawing machine including means for supporting a bundle of hair; a table; means movable relatively to said bundle and adapted to successively grip and draw hairs of different lengths therefrom and convey them over said table; and an apron movable over said table during the drawing action of the hairs and adapted to support the portion of the hairs not supported by the gripping means; substantially as described.

7. A hair drawing machine including means for supporting a bundle of hair; a table; means movable relatively to said bundle and adapted to successively grip and draw hairs of different lengths therefrom and convey them over said table; an apron movable over said table during the drawing action of the hairs and adapted to support the portion of the hairs not supported by the gripping means; and means for removing said apron from over the table to permit said hairs to be packed thereon; substantially as described.

8. A hair drawing machine including means for supporting a bundle of hair; a table; means movable relatively to said bundle and adapted to successively grip and draw hairs of different lengths therefrom and convey them over said table; a spring roller; an apron wound thereon; means movable in conjunction with said gripping means and adapted to grasp said apron and draw it over said table so as to support the portion of the hairs not supported by the gripping means; and means for releasing said apron grasping means whereby the spring roller will wind the apron thereof and move it from over said table; substantially as described.

9. A hair drawing machine including means for supporting a bundle of hair; a table; means operative to grip and draw hairs of different lengths successively from said bundle and convey them over the table;

a spring support for said table; a toothed rack; and a spring pressed latch on said table adapted to successively engage lower teeth on said rack as the table is moved downwardly due to the packing of the hairs thereon; substantially as described.

10. A hair drawing machine including means for supporting a bundle of hair; a table; means operative to grip and draw hairs of different lengths successively from said bundle and convey them over the table; and means for holding said table in successively lowered positions as the table is moved downwardly due to packing of the hairs thereon; substantially as described.

11. A hair drawing machine including means for supporting a bundle of hair; gripping means movable relatively to said bundle and adapted to successively grip and draw hairs therefrom; an apron upon which said bundle of hair rests; means for imparting an independent relative movement of the bundle and gripping means toward each other whereby the gripping means after having drawn the longer hairs from the bundle will draw the shorter ones therefrom; and a spring roller for winding a portion of said apron thereon so as to move the apron out of the way of the gripping means during said independent relative movement; substantially as described.

12. A hair drawing machine including a base structure; means for supporting a bundle of hair; gripping means; means for moving said gripping means relatively to said bundle to cause said gripping means to successively grip and draw hairs of different lengths therefrom; a frame for carrying said first means and slidably mounted on said supporting structure; a shaft; a cable wound on said shaft and having a portion attached to a part of said frame; and means operative in conjunction with said gripping means for rotating said shaft whereby the cable is wound thereon and the frame is moved upwardly so as to present various portions of the thickness of said bundle to said gripping means; substantially as described.

13. A hair drawing machine including a base structure; means for supporting a bundle of hair; gripping means; means for moving said gripping means relatively to said bundle to cause said gripping means to successively grip and draw hairs of different lengths therefrom; a frame for carrying said first means and slidably mounted on said supporting structure; a shaft; a cable wound on said shaft and having a portion attached to a part of said frame; a ratchet wheel; a pivotally mounted lever; a pawl on said lever for engagement with said ratchet wheel; and means operative in conjunction with said gripping means and adapted to actuate said lever whereby said pawl rotates said shaft to wind the cable thereon and thereby raise the frame to present various portions of the thickness of said bundle to the gripping means; substantially as described.

14. A hair drawing machine including a base structure; means for supporting a bundle of hair; gripping means; means for moving said gripping means relatively to said bundle to cause said gripping means to successively grip and draw hairs of different lengths therefrom; a frame for carrying said first means and slidably mounted on said supporting structure; a shaft; a cable wound on said shaft and having a portion attached to a part of said frame; a ratchet wheel; a pivotally mounted lever; a pawl on said lever for engagement with said ratchet wheel; means operative in conjunction with said gripping means and adapted to actuate said lever whereby said pawl rotates said shaft to wind the cable thereon and thereby raise the frame to present various portions of the thickness of said bundle to the gripping means; a detent on said supporting structure for engagement with said ratchet wheel to normally hold said ratchet wheel; and means carried by said frame and adapted to move said detent out of engagement with said ratchet wheel after said frame has moved upwardly a predetermined distance so as to permit said frame to move downwardly; substantially as described.

15. A hair drawing machine including a base structure; means for supporting a bundle of hair; gripping means; means for moving said gripping means relatively to said bundle to cause said gripping means to successively grip and draw hairs of different lengths therefrom; a frame for carrying said first means and slidably mounted on said supporting structure; a shaft; a cable wound on said shaft and having a portion attached to a part of said frame; a ratchet wheel; a pivotally mounted lever; a pawl on said lever for engagement with said ratchet wheel; means operative in conjunction with said gripping means and adapted to actuate said lever whereby said pawl rotates said shaft to wind the cable thereon and thereby raise the frame to present various portions of the thickness of said bundle to the gripping means; a detent on said supporting structure for engagement with said ratchet wheel to normally hold said ratchet wheel; means carried by said frame and adapted to move said detent out of engagement with said ratchet wheel after said frame has moved upwardly a predetermined distance so as to permit said frame to move downwardly; a latch for holding said detent out of engagement with the ratchet wheel during the falling of said frame; and means on said frame operative to release said detent from the latch during the downward movement of the frame to permit said detent to again engage said ratchet; substantially as described.

16. A hair drawing machine including a base structure; means for supporting a bundle of hair; gripping means; means for moving said gripping means relatively to said bundle to cause said gripping means to successively grip and draw hairs of different lengths therefrom; a frame for carrying said first means and slidably mounted on said supporting structure; a shaft; a cable wound on said shaft and having a portion attached to a part of said frame; a ratchet wheel; a pivotally mounted lever; a pawl on said lever for engagement with said ratchet wheel; means operative in conjunction with said gripping means and adapted to actuate said lever whereby said pawl rotates said shaft to wind the cable thereon and thereby raise the frame to present various portions to the thickness of said bundle to the gripping means; a detent on said supporting structure for engagement with said ratchet wheel to normally hold said ratchet wheel; means carried by said frame and adapted to move said detent out of engagement with said ratchet wheel after said frame has moved upwardly a predetermined distance so as to permit said frame to move downwardly; a latch for holding said detent out of engagement with the ratchet wheel during the falling of said frame; means on said frame operative to release said detent from the latch during the downward movement of the frame to permit said detent to again engage said ratchet; and means for adjusting said latter means on the frame whereby the time of release of said detent can be varied; substantially as described.

17. A hair drawing machine including means for supporting a bundle of hair; gripping means movable relatively to said bundle and adapted to successively grip and draw hairs therefrom; means for causing said hair supporting means to be raised and lowered relatively to said gripping means; and means for moving said hair supporting means toward said gripping means; substantially as described.

18. A hair drawing machine including means for supporting a bundle of hair; gripping means movable relatively to said bundle and adapted to successively grip and draw hairs therefrom; means for causing said hair supporting means to be raised and lowered relatively to said gripping means; means for moving said hair supporting means toward said gripping means; means for limiting the downward movement of said hair supporting means; and means for adjusting said limiting means whereby it can be raised and lowered; substantially as described.

19. A hair drawing machine including means for supporting a bundle of hair; gripping means movable relatively to said bundle and adapted to successively grip and draw hairs therefrom; means for causing said hair supporting means to be raised and lowered relatively to said gripping means; means for limiting the downward movement of said hair supporting means; means for adjusting said limiting means whereby it can be raised and lowered; a belt connected to said hair supporting means; a ratchet movable downwardly in conjunction with said hair supporting means; a pawl on said limiting means; and means operatively connecting said ratchet with said belt whereby when said hair supporting means moves downwardly the ratchet will be engaged by said pawl and thereby actuated to move said belt and hair toward said gripping means; substantially as described.

20. A hair drawing machine including means for supporting a bundle of hair; gripping means movable relatively to said bundle and adapted to successively grip and draw hairs therefrom; means for causing said hair supporting means to be raised and lowered relatively to said gripping means; means for limiting the downward movement of said hair supporting means; means for adjusting said limiting means whereby it can be raised and lowered; a belt connected to said hair supporting means; a ratchet movable downwardly in conjunction with said hair supporting means; a pawl on said limiting means; means operatively connecting said ratchet with said belt whereby when said hair supporting means moves downwardly the ratchet will be engaged by said pawl and thereby actuated to move said belt and hair toward said gripping means; and means for preventing rotation of said ratchet wheel during the drawing action of said gripping means; substantially as described.

21. A hair drawing machine including a base structure; means for supporting a bundle of hair; a table; means movable relatively to said bundle and adapted to successively grip and draw hairs of different lengths therefrom and convey them over said table; means for causing said hair supporting means to be raised and lowered; a magazine; spacing strips in said magazine; fingers operative in conjunction with said gripping means for removing said spacing strips from the magazine; and means against which said spacing strips abut during said movement of the fingers whereby the strips are freed from the fingers and drop upon the hairs on said table; substantially as described.

22. A hair drawing machine including a base structure; means for supporting a bundle of hair; a table; means movable relatively to said bundle and adapted to successively grip and draw hairs of different lengths therefrom and convey them over said table; means for causing said hair supporting means to be raised and lowered; a magazine; spacing strips in said magazine; fingers operative in conjunction with said gripping means for removing said spacing strips from the magazine; means against which said spacing strips abut during said movement of the fingers whereby the strips are freed from the fingers and drop upon the hairs on said table, said magazine consisting of a belt having spring clips thereon; a shaft for moving said belt; a ratchet wheel connected to said shaft; a lever; a pawl connected to said lever and operative on said ratchet wheel; a cable connected to said lever; a second lever to which said cable is attached; and means operative in conjunction with said latter lever whereby the pawl will be actuated to move said belt intermittently so as to bring the spacing strips successively in alignment with said fingers; substantially as described.

23. A hair drawing machine including a base structure; means for supporting a bundle of hair; a table; means movable relatively to said bundle and adapted to successively grip and draw hairs of different lengths therefrom and convey them over said table; means for causing said hair supporting means to be raised and lowered; a magazine; spacing strips in said magazine; fingers operative in conjunction with said gripping means for removing said spacing strips from the magazine; means against which said spacing strips abut during said movement of the fingers whereby the strips are freed from the fingers and drop upon the hairs on said table; and means operative by the movement of said hair supporting means for abutting said magazine to move the spacing strips in alignment with said fingers; substantially as described.

24. A hair drawing machine including means for supporting a bundle of hair; a table; means movable relatively to said bundle and adapted to successively grip and draw hairs of different lengths therefrom and convey them over said table; a magazine; spacing strips in said magazine; and means operative to successively transfer said spacing strips from the magazine and position them on the hair on said table; substantially as described.

In testimony whereof I have signed my name to this specification in the presence of two subscribing witnesses.

MAX PERKINS.

Witnesses:
ANNA RENTON,
AUGUSTUS B. COPPES.